Aug. 28, 1934.  F. E. STAHL  1,971,512
METHOD OF FORMING A REENFORCING SWELL ON THE INSIDE OF WELDED CHAIN LINKS
Filed July 24, 1933  2 Sheets-Sheet 1
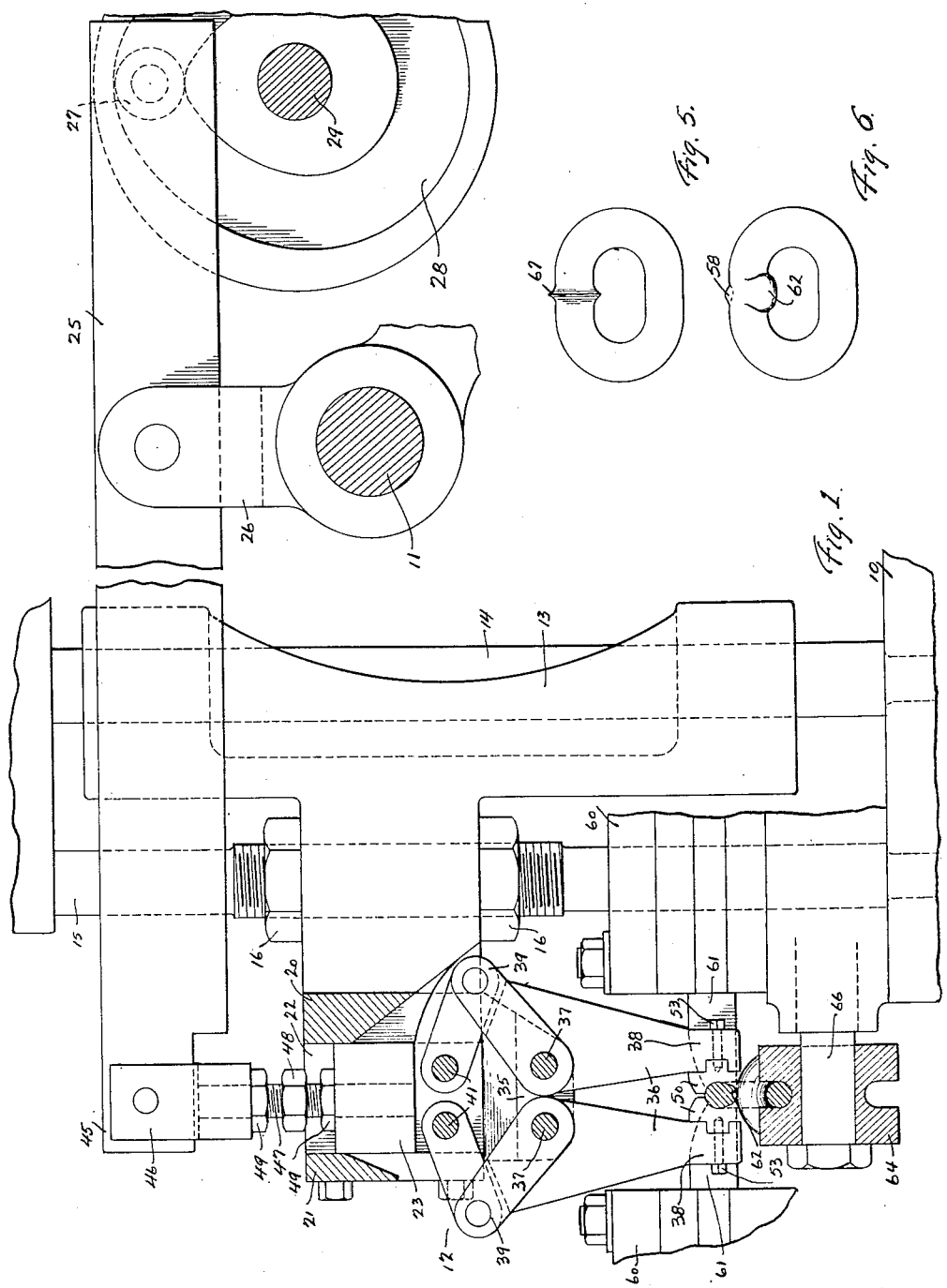
INVENTOR
FRANK E. STAHL
By J. W. Ellis
ATTORNEY Aug. 28, 1934.  F. E. STAHL  1,971,512
METHOD OF FORMING A REENFORCING SWELL ON THE INSIDE OF WELDED CHAIN LINKS
Filed July 24, 1933  2 Sheets-Sheet 2
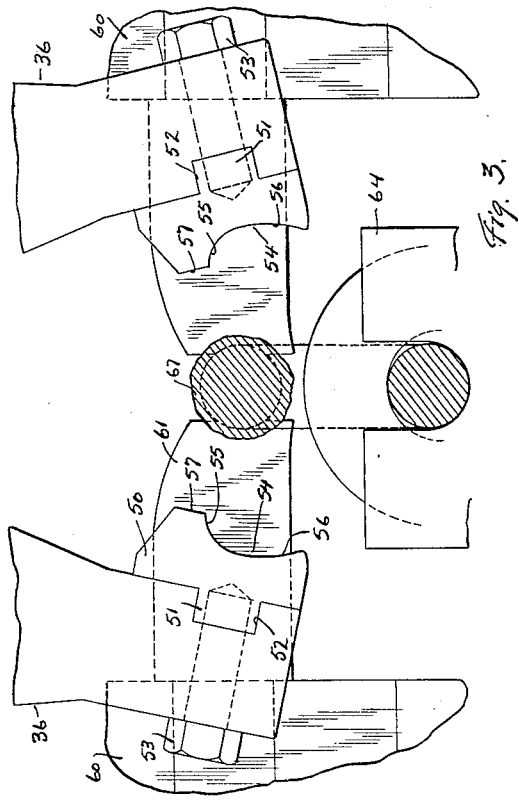
INVENTOR
FRANK E. STAHL
By
ATTORNEY Patented Aug. 28, 1934

1,971,512

UNITED STATES PATENT OFFICE 1,971,512

METHOD OF FORMING A REENFORCING SWELL ON THE INSIDE OF WELDED CHAIN LINKS

Frank E. Stahl, Tonawanda, N. Y.

Application July 24, 1933, Serial No. 681,876

3 Claims. (Cl. 59—35)

My invention relates in general to the welding and the formation of a swell at the welded joint of a chain link, and more particularly to the reforming of such swell on the inside of the chain link so as to thereby retain the strength of the swell.

It is well known to those skilled in the art that when forming joints by means of butt welding, a swell is produced about the welded joint. This swell is very desirable since it increases the strength of the welded joint to the strength of the stock from which the chain link is made and in many cases increases the strength thereof over that of the stock. However, such swell can not be present on the outside of links of most all types of chain, and, therefore, it is the general practice to remove such swell by pinching, grinding, or cutting, thus losing all of the advantages resulting from the presence of the swell. I have discovered that this swell may be reformed and concentrated on the inside of the link which gives to the link the desired added strength, and also leaves a smooth exterior surface.

One of the principal objects of my invention has been, therefore, to provide a method whereby the swell at the welded joints of chain links may be reformed and concentrated to the inside of the blank.

The above object and advantages have been accomplished by the method herein described. Such method may be carried out by the apparatus shown in the accompanying drawings, in which:

Fig. 1 is a side, sectional elevation of one form of device.

Fig. 2 is a front elevation thereof.

Fig. 3 is an enlarged, fragmentary, side view showing a link in place just before being acted upon by the device.

Fig. 4 shows the link being acted upon.

Fig. 5 is a view of the link with the swell which is produced by the welding operation.

Fig. 6 is a similar view of the finished joint, showing the swell reformed.

In the drawings I have shown but one form of apparatus for carrying out my method, it being obvious that other forms of apparatus may be employed.

My method is, of course, to be carried out in connection with the welding machine for butt welding the joints of chain links and the form of apparatus shown in the drawings is designed to be suspended above the finished joint and to be so positioned that it will act upon the joint after the welding operation has been completed.

In the drawings I have shown but in fragmentary and somewhat diagrammatical manner the parts of the welding machine. As here shown, 10 is the bed of the machine and 11 is a fulcrum shaft suitably secured to some portion of the bed. My device 12 is supported by a bracket 13 which is slidably mounted for adjustment upon one of the vertical transformer posts 14. Another transformer post 15 passes through the bracket and is screw-threaded for the reception of adjusting nuts 16. These nuts are made to bear upon the top and bottom surfaces of the bracket and to thereby make it possible to adjust the bracket vertically. At the forward end of the bracket 13 there is formed a block guide 20 which has a cover 21 secured at its forward side. This guide is provided with a rectangular guideway 22 for the reception of the toggle block 23 which is slidable vertically within the guide.

A ram lever 25 is arranged over the block guide and is pivotally carried by a fulcrum arm 26. This fulcrum arm is rotatably supported by the fulcrum shaft 11 hereinbefore referred to. The rear end of the fulcrum lever is provided with a cam roller 27 which engages the cam 28. This cam serves to actuate my device and is mounted upon a shaft 29 which may be one of the shafts of the welding machine or a shaft separately provided for my device and properly timed in relation to the actuation of the welding machine.

The block guide 20 is extended downwardly and is provided with a lateral slot 35 within which are disposed two oppositely arranged rocker arms 36. These rocker arms are pivotally mounted upon rocker arm pins 37, and each of these arms has a downwardly extending leg 38 and an upwardly extending leg 39. The upwardly extending legs also extend away from the vertical axis of the toggle block 23 and each of them is bifurcated. In the bifurcated leg 39 of each of the rocker arms is disposed one end of a toggle link 40. The opposite ends of the toggle links are pivotally attached by means of toggle pins 41 to the toggle block 23, a slot 42 being formed in the block for the reception of the links.

The toggle block 23 is connected to the outer end 45 of the ram lever 25 by means of a yoke 46 and an adjusting screw 47. The adjusting screw is provided with a right and left hand thread, one portion passing into the yoke 46 and the other portion into the toggle block 23. A nut 48 is formed upon the screw so that it may be rotated, and suitable lock nuts 49 are provided for setting the screw in its adjusted position. By means of the screw the distance between the pressure exerted by the working faces of the rocker arms may be adjusted.

To the lower leg 38 of each of the rocker arms is secured a swell-reforming anvil 50. Each of these anvils is preferably provided with a projection 51 which fits into a recess 52 formed in the leg, and each is held in place within the recess and against the leg by means of a bolt 53. Each of the anvils is provided with a working face 54 having its upper portion 55 of a radius substantially the same as the radius of the stock forming the link, so that the metal in the swell at the welded joint with which this surface first contacts will be reformed, by being forced inwardly thus leaving the surface of the link with which this surface engages of substantially the same radius as the radius of the stock from which the link is made. Joining this surface is a surface 56 of increased radius so that when the anvils are brought together, as shown in Fig. 3, there will be provided some space into which the material of the swell 62 may be forced. By this formation the anvil surfaces 55 will initially contact with the metal of the swell at the joint at points substantially near the center of the outside of the periphery of the link joint. After this initial contact, the surfaces 55 and 56 will permanently contact with the metal of the welded joint and force the metal from around the outside surfaces of the link at the joint and displace it inwardly toward the inside surface of the link from which it protrudes, as shown in Figs. 2 and 6. It is preferable that the flat surfaces 57 of the anvils immediately above the surfaces 56 do not completely close when the rocker arms have moved the anvils to their closed positions, for the reason that all the metal can not be completely removed from the upper part of the link and a slight tab 58 is thereby formed. This tab is subsequently removed preferably by tumbling. The material in this tab 58 which is subsequently removed is not sufficient to in anywise affect the strength of the finished joint.

Also shown in the drawings are the electrode carriers 60 of the welding machine, upon each of which is mounted an electrode 61. The legs 38 of the rocker arms and the anvils 50 are mounted between the pair of electrodes 61. As shown in Figs. 3 and 4 the electrode carriers and rocker arms are so timed that the electrodes have been removed when the anvils are brought into operative position.

The chain 63 (see Fig. 2) is suitably supported by the usual timing sprocket 64 while the chain is being acted upon. In Fig. 2 I also show the pushers 65 of the welding machine which serve to force the ends of the link together when the welding heat has been reached. The timing sprocket is, of course, actuated in timed relation by means of the shaft 66 and interconnected means (not shown).

According to my method, after the welding operation is completed and the ends of the link have been forced together so as to complete the weld and form the usual swell 67 extending substantially uniformly around the joint shown in Fig. 5, the ram lever 25 is actuated by the cam 28 which causes the toggle block 23 to be moved downwardly. This reciprocal movement of the toggle block will, through the medium of the toggle links 40 and upper legs of the rocker arms, produce a powerful force upon the lower legs 38 of the rocker arms to carry them inwardly toward each other and to force the anvils 50 against the bulge or swell 67 at the welded joint, and, thereby, force the metal of the swell to flow in a direction substantially at right angles to the direction of pressure exerted upon the swell by the dies, so that the swell is reformed on the inner side of the link, as shown in Fig. 4. Thereby the metal which produces the reformed swell is made to flow in a line substantially at right angles to the longitudinal axis of the link. Just as soon as the swell 62 is formed the forward end 45 of the ram lever is elevated and the lower legs 38 of the rocker arms are separated by means of the toggle links and toggle block, whereupon the finished link is moved away and another link is moved into operative position by means of the timing sprocket.

Having thus described my invention, what I claim is:

1. The method of forming a reenforcing swell on the inside of a welded chain link, comprising the formation of a swell at the joint by the application of welding heat and pressure, then reforming such swell by displacing substantially all of the metal in the swell at the joint and forcing it inwardly so as to form a permanent reenforcing swell on the inside of the link by the application of pressure from opposite sides of the welded joint and at right angles to the desired direction of flow of the displaced metal, and simultaneously forming a substantially smooth exterior surface at the joint.

2. The method of forming a reenforcing swell on the inside of a welded chain link, comprising the formation of a swell at the joint by the application of welding heat and pressure, then reforming such swell by displacing substantially all of the metal in the swell at the joint and forcing it inwardly so as to form a permanent reenforcing swell on the inside of the link by the initial application of pressure from opposite sides of the welded joint on the outer periphery of the link and by progressively advancing such pressure upon the periphery of the welded joint, and simultaneously forming a substantially smooth exterior surface at the joint.

3. The method of forming a reenforcing swell on the inside of a welded chain link, comprising the formation of a swell on the joint by the application of welding heat and pressure, then reforming such swell by displacing substantially all of the metal in the swell at the joint and forcing it inwardly so as to form a permanent reenforcing swell on the inside of the link by the initial application of pressure from opposite sides of the welded joint on the outer periphery of the link and by progressively advancing such pressure upon the periphery of the welded joint, and simultaneously so forming the periphery of the welded joint that it is of substantially the same cross-sectional shape as the link stock, except where the reenforcing swell is formed.

FRANK E. STAHL.